No. 786,482. PATENTED APR. 4, 1905.
J. CALDWELL.
FRUIT PITTING MACHINE.
APPLICATION FILED APR. 2, 1903.
2 SHEETS—SHEET 1.
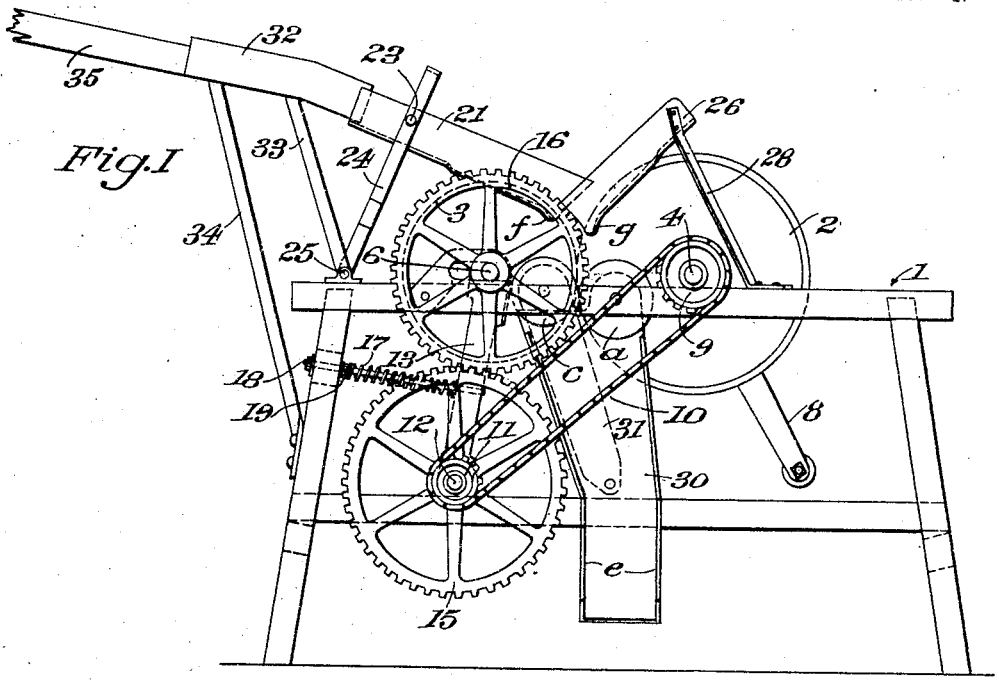
Fig. I
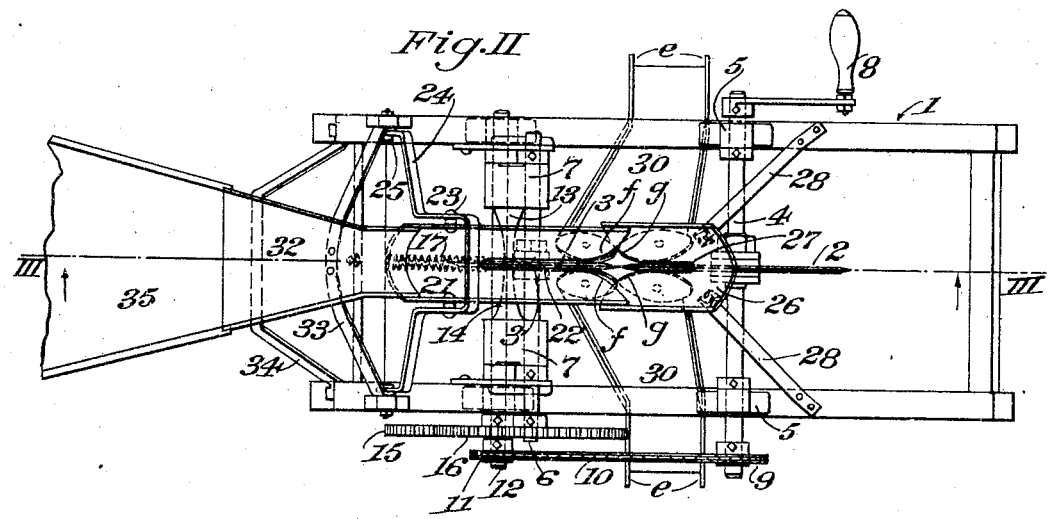
Fig. II
Witnesses
Geo. L. Goetz
Albert H. Merrill
Inventor
Jerome Caldwell
by Townsend Bro.
his attys.

No. 786,482. PATENTED APR. 4, 1905.
J. CALDWELL.
FRUIT PITTING MACHINE.
APPLICATION FILED APR. 2, 1903.
2 SHEETS—SHEET 2.
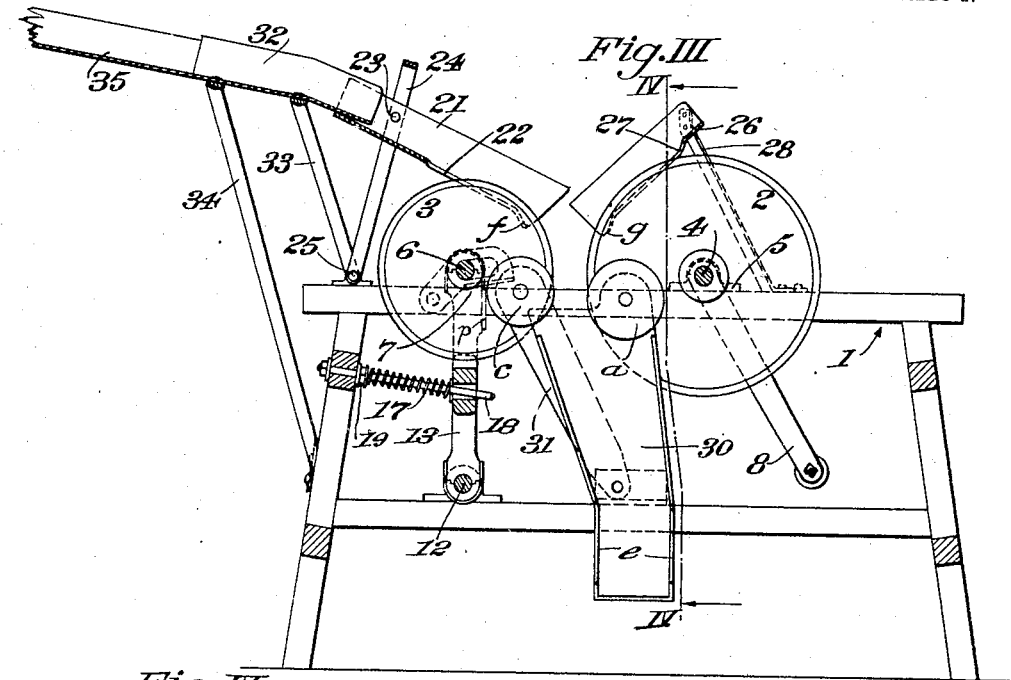
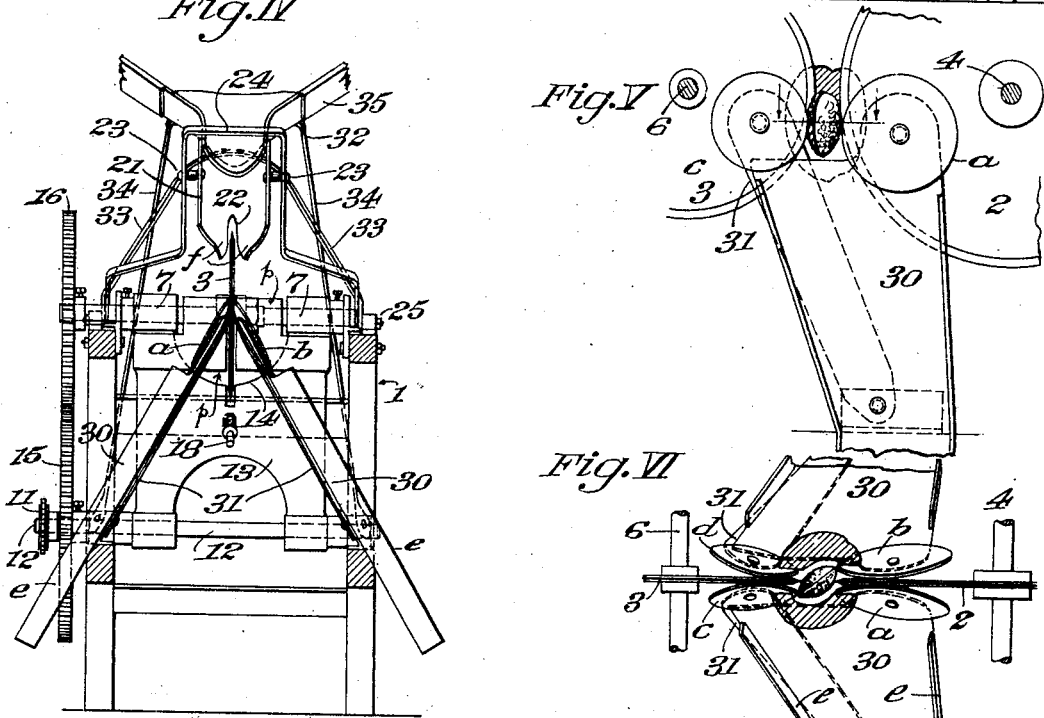
Witnesses
Geo. L. Goetz
Albert H. Merrill
Inventor
Jerome Caldwell
by Townsend Bro.
his attys No. 786,482.

Patented April 4, 1905.

UNITED STATES PATENT OFFICE.

JEROME CALDWELL, OF LOS ANGELES, CALIFORNIA.

FRUIT-PITTING MACHINE.

SPECIFICATION forming part of Letters Patent No. 786,482, dated April 4, 1905.

Application filed April 2, 1903. Serial No. 150,695.

*To all whom it may concern:*

Be it known that I, JEROME CALDWELL, a citizen of the United States, residing at Los Angeles, in the county of Los Angeles and State of California, have invented new and useful Improvements in Fruit-Pitting Machines, of which the following is a specification.

This invention relates to that class of fruit-pitting machines in which coöperating rotary cutting-disks are mounted in such a way that they seize the fruit between their cutting edges and carry it down between them, yielding relatively to each other to conform to the size of the pit against which they operate, and in which are also employed feeding mechanism to deliver the fruit to the disks and spreading devices adjacent to the disks to separate the pulp from the pit as the fruit passes between and from said disks.

An object of this invention is to provide improved feeding means for conveying the fruits singly to and directing them squarely between the edges of the cutting-disks.
Another object is to provide a pitter which will cut the pulp through to the pit on all sides thereof, so that the spreading devices may completely remove the pulp from the pit.

Another object is to provide improved means adapted to positively separate the pulp from the pit as the fruit passes between and from the cutting-disks, said pulp-separating means automatically adjusting themselves to different sizes of fruit and doing their work without bruising the pulp.

A further object is to provide a fruit-pitting machine of the class described in which the cutting-disks may be provided with smooth peripheries (instead of toothed or serrated) disks which have heretofore been employed, and yet so construct the machine that said disks will effectively seize their fruits between their cutting edges and carry them down between said edges. This end is mainly attained by providing rotary fruit-spreading devices yieldingly mounted adjacent to the cutting-disks, said rotary spreaders effectively separating the pulp from the pits without opposing the advance of the fruits to such an extent as to make it necessary to provide teeth or serrations along the peripheries of the disks in order to draw the fruits positively downward between the cutting-disks when the same are rotated.

Cutting-disks having smooth peripheral cutting edges are superior to those having peripheral teeth or serrations for the following reasons: First, a smooth cutting edge does not bruise the fruit, but a toothed or serrated edge will bruise the fruit more or less; second, a smooth-edged disk is not so dangerous to the operator; third, a smooth-edged disk is easier to manufacture and also easier to sharpen; fourth, the disk with a smooth cutting edge will make a clean cut next to the pit, whereas some portions of the edge of a toothed disk will not reach to the side of the pits on account of being held away by the points of the teeth and at the points the cut will not be clean and parts of the pulp will be left adhering to the pit.

I have found it impossible to successfully employ smooth-edged cutting-disks in connection with the non-rotatable spreading devices heretofore in use because the fruits clog on account of pits becoming stuck between the cutter-disks and the spreaders. Such clogging, however, is impossible between the edge of the spreader and the moving sides of the cutter-disks when the spreaders are rotatably mounted, as hereinafter described.

Other objects and advantages will appear when the invention is considered in connection with the accompanying drawings, in which—

Figure I is a side elevation of a complete machine embodying this invention. Fig. II is a plan view of Fig. I. Fig. III is a vertical mid-section on line III III, Fig. II, looking in the direction indicated by arrows, but including the nearest discharge-spout and adjacent parts. Fig. IV is a vertical cross-section on line IV IV, Fig. III, looking in the direction indicated by arrows and omitting the part 26 and disk 2. Figs. V and VI are detailed side and plan views, respectively, of the fruit-spreading devices and adjacent parts.

Referring more particularly to the drawings, 1 designates the main frame of the machine, upon which are rotatably mounted a pair of coöperating circular knives or cutter-disks 2 and 3, having smooth peripheral cutting edges in proximity to each other. As the shaft 4, to which disk 2 is fixed, rotates in stationary bearings 5, said disk 2 will be called the "stationary" disk to distinguish from disk 3, which will be called the "movable" disk, because the shaft 6, to which it is fixed, is mounted in movable bearings 7. The stationary disk 2 may be somewhat larger than the movable disk 3, as shown.

Power may be applied by a crank 8 to the shaft 4 and conveyed therefrom by a sprocket 9 and chain 10 to a sprocket 11, fixed to a gear-shaft 12. To said gear-shaft 12 is pivoted an arm 13, which carries the shaft 6 of the movable disk at its free end. The bearings 7 of the shaft 6 are located in each side of a bifurcation 14, cut into the upper end of arm 13 to make room for the lower side of the movable cutter-disk.

15 designates a driving gear-wheel fixed to the stationary gear-shaft 12 and meshing with a driven gear-wheel 16, fixed to the movable shaft 6 to rotate movable disks 3.

17 is a spring engaging arm 13 to yieldingly hold the movable cutter-disk adjacent to the stationary cutter-disk. Said spring 17 may be mounted upon a rod 18 and may bear upon the frame at one end and upon arm 13 at the other end, as shown. 19 is a nut whereby the tension of the spring may be manually adjusted.

21 is a movable feed-trough, preferably V-shaped and arranged with its axis approximately tangential to the cutter over which it is mounted. Said trough is provided with a longitudinal slot 22, extending upward along the bottom from the lower end of the trough, so that the movable or feeder cutter 3 projects up through said slot, as shown, whereby fruits may be fed tangentially to the upper portion of the cutter over which said trough is mounted. Said slot 22 extends to the discharge end of trough 21 in order that the edge of the cutting-disk 3 may continue to cut into a fruit as it passes down out of the discharge end of the trough. The advantages resulting from this construction are, first, that it prevents clogging of the fruit at the lower end of the trough, since the upper edge of the cutter-disk engages the lower sides of the fruit in the trough and by its rotation assists in moving said fruit forward; second, since the cutter is located exactly at the mid-width of the trough when it begins to cut into the fruit before it leaves the trough the first cut is made directly toward the center of the fruit, and since the blade of the cutter remains in line with the cut thus started until the fruit reaches the stationary disk opposite thereto (as will hereinafter appear) the cuts are both positively directed toward the pit; third, when the disk which first engages the fruit begins to make its cut it imparts a rolling movement to the fruit, and thereby cuts far enough around the pit, so that the further action of said disk, combined with the action of its companion disk 2, may be relied upon to fully complete the cut on all sides of the pit.

It will be noted that the above-described construction makes the disk over which the trough is mounted perform a double function, the function of an independent cutter and feeder, in addition to the cutting and feeding functions it performs in its coöperation with the other cutting-disk.

Feed-trough 21 is pivoted by pivots 23 to a standard 24. Said standard may consist of a bar bent into a loop, as shown, and pivoted to each side of the frame at 25. The center of gravity of the feed-trough is forward of both sets of pivots and forms what I shall call a "gravity-controlled trough," because the front or lower end of said trough is compelled by gravity to normally rest against a coöperating trough or guard 26 without the use of springs or other auxiliary appliances. The lower ends of these troughs have deflected fruit guarding and guiding portions $f$ $f$ and $g$ $g$, which have room between them for all except unusually large fruits to pass down to the cutters. When an unusually large fruit is fed to the machine, it will wedge in between the lower ends of the troughs, and the pivoted trough 21 will yield from the guard to allow it to pass.

The object of providing two sets of pivots in the mounting of the feed-trough is to allow it to yield directly backward without partaking of an undesirable tilting movement, as would be the case if there were only one set of pivots; but the invention is not limited to the particular means described for allowing the trough to accommodate itself to fruits of varying sizes.

The feed-guard may be semicircular in cross-section and is preferably somewhat wider than the trough 21 opposite thereto, so that the lower end of trough 21 may rest against and fit between the sides of the guard. 27 designates a slot in the bottom of the guard 26 to accommodate disk 2. Standards 28 may be provided to support the guard.

The supply-trough 21 being movably mounted will yield backward when an unusually large fruit is fed to the machine. The weight of said trough and of the fruit being fed therethrough tends to keep the deflected portions at the lower end of said trough resting against guard 26 and makes it unnecessary to employ any kind of spring-actuated mechanism to regulate the feeding of the fruits to the machine.

$a$ and $b$ designate inclined rotatable spreaders mounted upon inclined members 30. Said spreaders lie beside the stationary cutter and adjacent to the path of the fruits as they pass down between the cutter-disks. Said spreaders consist of disks, the upper sides of which preferably rest against the opposite sides of the cutter-disk. c and d designate the members of another pair of spreaders which coöperate with spreaders a b and are correspondingly arranged, being placed adjacent to the movable cutter 3, as shown. The members of each pair of these spreaders are mounted so that their peripheries converge toward the path of the downwardly-moving fruits, as by journaling or mounting them in an oblique or tilted position relatively to the disks, as shown, in order to make the pits fall between the inclined members 30, upon which the spreaders are mounted.

Figs. V and VI show the spreaders acting upon a rather large peach-pit which is passing between the cutter-disks in a position that would be apt to cause it to stick upon a non-rotary spreader. As clearly seen in Fig. VI, the rotation of spreaders c and b will effectually prevent any sticking of the pit, and owing to their tilted position said spreaders will thrust the pit positively downward between the pulp-discharging spouts 30 as the spreaders close in behind the pit. Owing to the arrangement of the spreading-disks with relation to the cutting-disks when a fruit is being operated on the spreaders are thereby thrown into more forcible contact with the side of the rotating cutter-disks, and such contact with the cutter-disks tends to facilitate the rotation of the spreaders in the desired direction, since said moving cutters tend to rotate the spreaders by frictional contact therewith.

The members 30 may be plates provided at each edge with an outturned flange e to form discharge-chutes for the pulp of the fruit. 31 designates the members of a pair of arms which may be pivoted to the under or inner sides of members 30 and upon which are pivotally mounted the spreaders c and d. 32 is a fixed feed-spout mounted on standards 33 and 34. Spout 32 may be provided with a contracted lower end and constructed to fit loosely into the upper end of movable feed-trough 21. By this arrangement the lower end of trough 21 is kept from dropping down too far, being upheld by reason of the upper end abutting against spout 32, which thus forms a stop for the trough. An additional supply-spout 35 may be provided, if desired, and supported by any suitable means. (Not shown.)

When a fruit is drawn downward between the cutting-disks by the rotation thereof, the inner edges of all four of the spreader-disks take into the cuts formed by the cutter-disks and widen said cuts by a combined rotary and wedging movement, thereby separating the pulp from the pit with so little friction and opposition to the forward movement of the fruit when properly adjusted that said smooth-edged cutting-disks may be relied upon to draw the pits positively downward. In this way the spreaders make a clean smooth separation of the pulp from the pit without pulling the pulp to pieces or leaving a portion thereof attached to the pit.

The spreaders c and d being mounted on pivoted arms, as described, yield with the movable cutter-disk to accommodate themselves to the size of the pit. The outer edges of said spreaders c and d preferably rest against plates p, carried by the arm 13, being thereby held in position to remove the pulp from the pit and being returned thereby to normal position after a fruit has passed between the cutters. Another advantage of these rotary spreaders over stationary spreaders is that they never clog the machine by catching into the pits of unusually large or irregularly-shaped fruits, since they always free themselves from the pits by rolling and yielding movements already described.

The operation is as follows: Fruits are delivered from the hopper to the feed-trough 21. A fruit will roll or slide down the trough until it reaches the slotted lower portion thereof, which extends over and on each side of the first cutter, where its downward movement will be accelerated by the rotation of the movable disk while it forms the initial cut. The fruit will then be guided downward squarely between the adjacent edges of the cutting-disks by the deflected end portions of the trough and the correspondingly-formed guard opposite thereto. The apparatus being placed in operation the stationary shaft 4 will rotate the circular knife or cutter 2 fixed thereto in one direction and the knife 3 in the opposite direction through the sprocket 9, chains 10, lower sprocket 11, shaft 12, driving gear-wheel 15, driven gear-wheel 16, and shaft 6. Hence if the crank 8 is turned in the proper direction a fruit as it drops from the feed-trough will be cut to the pit on each side. The pit will then be seized by the downwardly-moving inner edges of the cutters and drawn between the disks, the movable disk yielding from the stationary disk to allow the pit to pass. As the pit passes between the cutter-disks the four rotary spreaders take into the cuts formed in the pulp and separate it from the pit, the pulp being divided, part going down one discharge-spout and part down the opposite discharge-spout, while the pit falls between the discharge-spouts. Fruits may thus be fed through the machine in rapid succession by a single operator.

It will be noted that the rotatable spreaders impinge upon the sides of the cutters in such a way that the rotation of each cutter tends to rotate the spreaders adjacent thereto in the same direction, thereby reducing the friction of the spreaders upon the pulp.

The feed-trough 21 is shown mounted over the movable cutter; but it may be mounted over the stationary cutter, if desired. It is obvious that many modifications and many mechanical equivalents for elements which I have shown and described will readily suggest themselves to one skilled in the art to which my invention pertains, and I therefore do not limit myself to the exact elements or constructions shown or described.

What I claim, and desire to secure by Letters Patent of the United States, is—

1. In a fruit-pitter, a pair of coöperating rotary cutters, a stationary feed-guard over one cutting-disk, and a feed-trough over the other cutting-disk, said feed-trough being pivotally mounted on a pivoted support, said trough provided with deflected fruit-guiding portions at the lower end thereof.

2. In a fruit-pitter, a pair of coöperating rotary cutters, a stationary feed-guard over one cutting-disk, and a feed-trough over the other cutting-disk, said feed-trough being pivotally mounted on a pivoted support, and a member against which one end of said trough abuts to prevent the tilting thereof.

3. In a fruit-pitter, a pair of coöperating rotary cutters, a stationary feed-guard over one cutting-disk, and a feed-trough over the other cutting-disk, said feed-trough being pivotally mounted on a pivoted support, and means preventing the tilting of said trough.

4. In a fruit cutting and pitting machine, in combination, a frame, a pair of coöperating rotatable cutters, a gear-shaft mounted on the frame, an arm pivoted to said gear-shaft, a movable cutter-shaft carried by the free end of said arm, a driven gear-wheel fixed to the movable shaft, a driving gear-wheel mounted on the aforementioned gear-shaft and meshing with the driven gear-wheel, a stationary cutter-shaft, means operatively connecting the stationary cutter-shaft with said driving gear-wheel, means for feeding fruit to the cutters, means for rotating the cutter-shafts to force fruits downwardly between the cutters, oblique rotary spreading-disks converging toward the path of the pits, and oblique members below the spreaders to conduct away the pulp of the fruit.

5. In a fruit-pitter, a pair of coöperating cutter-disks, and a spreading-disk mounted adjacent to each side of one of the cutting-disks, and rotatable obliquely thereto.

6. In a fruit-pitter, a pair of coöperating cutter-disks, and a spreading-disk mounted adjacent to each side of each of the cutting-disks, and rotatable obliquely thereto.

7. In a fruit-pitter, a pair of coöperating cutter-disks, and a spreading-disk mounted adjacent to each side of one of the cutting-disks, and rotatable obliquely thereto, said spreading-disks converging at the side in the path of the descending fruits.

8. In a fruit-pitter, a pair of coöperating cutter-disks, and a spreading-disk mounted adjacent to each side of one of the cutting-disks, and rotatable obliquely thereto, said spreading-disks converging at the side in the path of the descending fruits and a similarly-arranged pair of spreading-disks for the other cutting-disk.

9. In a fruit-pitter, in combination, a frame, feeding means, smooth-edged cutting-disks, means for rotating said disks, and a rotatable spreader having its axis below the axis of said cutting-disks.

10. In a fruit-pitter, in combination, a frame, feeding means, smooth-edged cutting-disks, means for rotating said disks to force fruits downwardly therebetween, and a spreading-disk mounted adjacent to each side of a cutter-disk and rotatable obliquely thereto.

11. In a fruit-pitter, in combination, a frame, feeding means, a pair of vertical smooth-edged coöperating cutter-disks, means for rotating said disks to force fruits downwardly therebetween, and a spreading-disk adjacent to each side of one of the cutter-disks, said spreading-disks converging at the side adjacent to the path of the downwardly-moving pits, and being rotatable in an oblique plane.

12. In a fruit-pitter, in combination, a frame, feeding means, a pair of smooth-edged coöperating cutter-disks, means for rotating said disks to force fruits downwardly therebetween, and a spreading-disk adjacent to each side of one of the cutter-disks, and rotatable obliquely thereto, said spreading-disks converging at the side adjacent to the path of the downwardly-moving pits, the other cutting-disk being provided with similarly-arranged spreading-disks.

13. In a fruit-pitter of the class described, the combination, with the rotary cutter-disks, of a rotatable spreader inclined toward and impinging upon one of said cutter-disks whereby the rotation of the cutter-disk tends to rotate the spreader in the same direction.

14. In a fruit-pitter, in combination, a pair of vertical coöperating cutting-disks, means for rotating said disks to feed fruits therebetween, and a spreader rotatable in an oblique plane.

15. In a fruit-pitter, in combination, a frame, feeding means, cutting-disks, means for rotating said disks, and a rotatable spreader having its axis below the axis of said cutting-disks.

16. In a fruit-pitting machine, in combination, a frame, a feed-trough having converging inner sides and an opening along the bottom extending to the discharge end thereof, a cutting-disk having its edge in position to engage fruits passing over said opening and down from said trough, means for rotating said disk, and cutting means adapted to form a cut opposite the cut made by said disk.

17. In a fruit-pitting machine, in combination, a frame, a feed-trough having a longitudinal slot in the bottom, extending to the discharge end thereof, a cutter-disk having its upper edge in position to engage fruits, as they pass over said slot and down out of the discharge end of said trough, and a companion cutting-disk adapted to form a cut opposite the cut of the first-named disk.

18. In a fruit-pitter of the class described, the combination, with the rotary cutters, of coöperating rotatable spreader-disks impinging upon said rotary cutters and thereby tending to be rotated, said spreading-disks having their axes below the axes of said cutting-disks.

19. In a fruit-pitter, the combination, with a frame, of rotatable cutters thereon, one of which is movable toward and from the other, rotatable spreaders journaled adjacent to the cutters, a longitudinally-movable trough above the movable cutter, an arm pivotally secured to the frame at one end and to the trough intermediate its length at the other, and a stop for each end of the trough, the stop at the inner end limiting its longitudinal movement in one direction and the stop at the outer end limiting the vertical movement of the ends of the trough.

20. In a fruit-pitter, the combination, with a frame, of rotatable cutters thereon, one of which is movable toward and from the other, spreaders and a trough for each cutter, the inner ends of the troughs being normally in contact and slotted longitudinally and each fitting over its respective cutter and provided with deflected portions, the trough over the movable cutter being movable longitudinally.

In testimony whereof I have signed my name to this specification, in the presence of two subscribing witnesses, at Los Angeles, in the county of Los Angeles and State of California, this 27th day of March, 1903.

JEROME CALDWELL.

Witnesses:
ALBERT H. MERRILL,
FREDERICK S. LYON.